INVENTOR
GUSTAV GUANELLA
BY KARL RATH
ATTORNEY

INVENTOR
GUSTAV GUANELLA
BY
KARL RATH
ATTORNEY

INVENTOR
GUSTAV GUANELLA
BY
KARL RATH
ATTORNEY

United States Patent Office 3,439,279

Patented Apr. 15, 1969

3,439,279

SYNCHRONIZING SYSTEM FOR RANDOM SEQUENCE PULSE GENERATORS

Gustav Guanella, Zurich, Switzerland, assignor to Patelhold Patenverwertungs- & Elektro-Holding AG, Glarus, Switzerland Filed Nov. 25, 1966, Ser. No. 596,894
Claims priority, application Switzerland, Nov. 26, 1965, 16,349/65
Int. Cl. H03k 1/12
U.S. Cl. 328—63 11 Claims

ABSTRACT OF THE DISCLOSURE

A first random sequence pulse generator of the type comprising a pulse shift register having a feedback circuit connecting a pair of higher register stages with a lower stage through a logical circuit, is synchronized with a second identical pulse generator by applying the output pulses of both generators to the inputs of a modulus-two adder, the output of which is applied to the input of an auxiliary shift register having a feedback circuit identical to said first and second generators. The input and output of the auxiliary register are connected to the inputs of an AND circuit whose output serves to control a binary state reversing device inserted in the feedback circuit of the first register.

The present invention relates to a system for the synchronization of random sequence pulse generators, more particularly to generators of the type comprising a pulse shift register, or the like pulse converting chain, in conjunction with one or more logic circuits or devices connecting predetermined stages with a preceding stage of said register through a return or feedback path or circuit. Depending upon the character of the logic circuit used, such as in the form of an exclusive OR-circuit or modulus-two adder, cyclic random pulse sequences may be produced by a device of this type from some or all of the $2^s$ different states of the register chain, wherein $s$ denotes the number of register stages.

A cyclic succession of such random pulse sequences has many uses and applications in such fields as digital computters, random number generation, as well as in communications work, such for instance as in conjunction with information scrambling and unscrambling methods involving the utilization of identical and synchronous scrambling pulse sequences at both the transmitting and receiving ends or stations of a communication system. By a suitable design of the shift registers or connection of the modulus-two adder or the like, it is possible, in the case of the referred to example, to achieve a random pulse sequence having a recurrence period or cycle which is long compared with a prevailing information or message duration, whereby to greatly enhance the difficulty of deciphering a scrambled message by an unauthorized receiver. As will be understood, however, the invention applies generally to the synchronization of any two or more random sequence pulse generators of the type referred to herein and involving a synchronous control or operation.

An important object of the present invention is the provision of a novel synchronizing system for a pair of random sequence pulse generators of the referred to type embodying means for comparing a pair of pulse sequences to be synchronized, to produce a correcting signal or pulse sequence for the control of the generator to be synchronized, to thereby effect and maintain its synchronism with the synchronizing generator, substantially independently of random disturbances of or errors in the synchronizing pulse sequence failing to affect or disturb the synchronism between the generators to be controlled or synchronized.

A more specific object of the invention is the provision, in conjunction with a synchronizing system of the referred to type, of means adapted to discriminate between disturbances or errors of the synchronizing pulse sequence having no effect on the synchronization of the generator to be synchronized, on the one hand, and disturbances effective in interferring with the synchronism of said generator, on the other hand.

Another object of the invention is to provide a synchronizing system for random sequence pulse generators of the referred to type being capable of distinguishing between genuine and simulated interference with the synchronism between two or more generators.

With the foregoing objects in view, the invention, according to one of its aspects, involves generally the provision of a synchronizing system comprising in combination a logic device or circuit in the form of an exclusive OR-circuit or modulus-two adder to which are applied the pulses of the sequences to be synchronized and produced by a pair of random sequence pulse generators of the referred to type, said device serving to supply, at least temporarily, monitoring or error-indicating pulses upon the occurrence of a random disturbance of the synchronism between the two pulse sequences to be synchronized, a monitoring circuit comprising a shift register and logic circuit being identical to the shift register and logic circuit of the pulse generators to be synchronized and connected to the output of said logic device, and an AND-circuit connected, respectively, to the input and output of said last-mentioned shift register, to produce a correcting pulse or signal by the output of said gate responsive to the disturbance of the synchronism between said generators and caused by one or more error pulses within the synchronizing pulse sequence, and finally means to reverse the polarity of the error pulse or pulses of the sequence being synchronized by said correcting pulse or pulses, to restore or maintain the synchronism of said generators or random pulse sequences produced thereby, in a manner as will become further apparent as the description proceeds in reference to the drawings.

The invention, both as to the foregoing and ancillary objects, as well as novel objects thereof, will be better understood from the following detailed description, taken in conjunction with the accompanying drawings forming part of this specification and in which.

Like reference characters denote like parts and circuits throughout the different views of the drawings.

Figure 1:
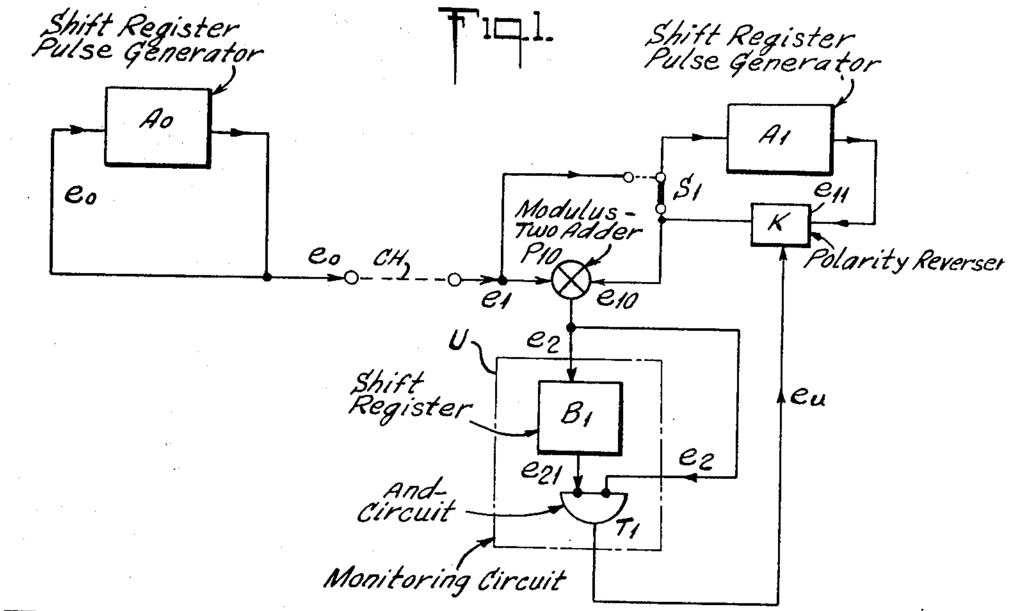
FIG. 1 is a block diagram of a basic random pulse sequence synchronization system constructed and operating in accordance with the principles of the invention.

Referring more particularly to FIG. 1, there are shown a pair of identical random sequence pulse generators of the type referred to herein and serving for instance as scrambling pulse generators at the transmitter and receiver, respectively, of a secrecy pulse signal information or message transmission system well known in the art, though not limited thereto. Each of said generators may comprise a feedback type shift register or the like sequential pulse storage device having a predetermined number of storage stages and being collectively designated by $A_0$ and $A_1$, respectively, in the drawing, to produce a pair of identical random pulse sequences $e_0$ and $e_{10}$ to be synchronized.

Figure 2A:
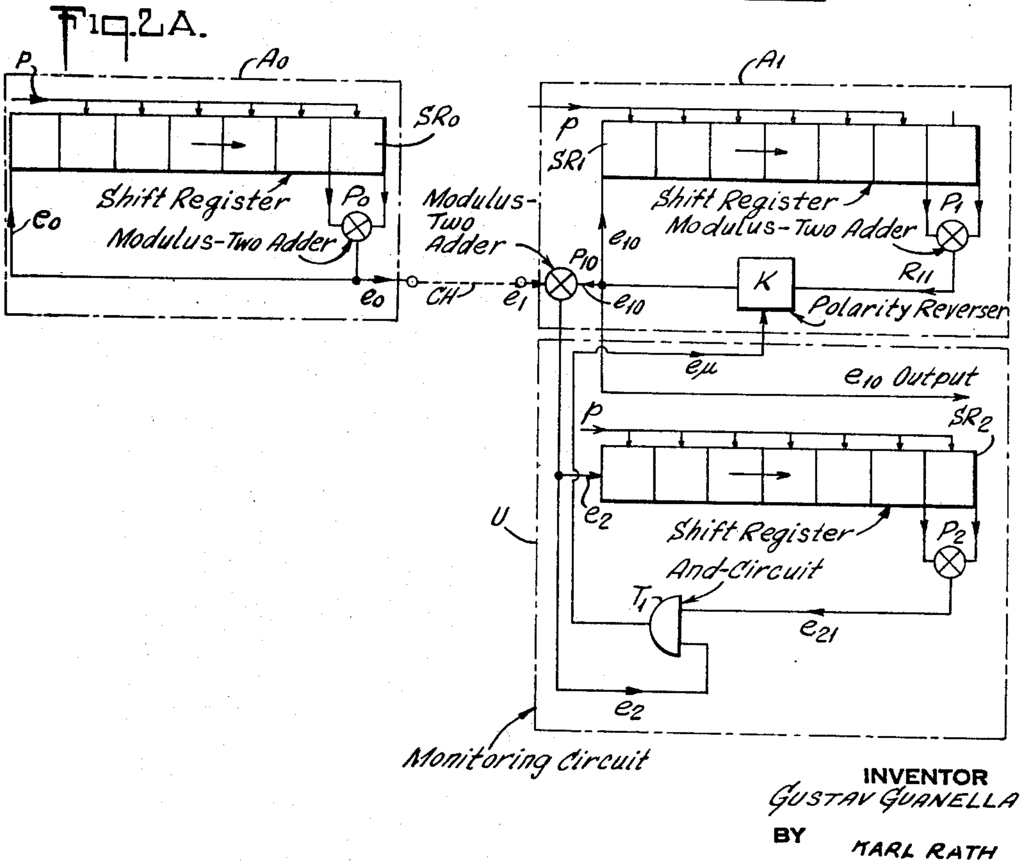
FIG. 2A is a more detailed diagram of a system to synchronize a pair of shift register feedback type random sequence pulse generators constructed and operating in accordance with the principles of the invention.

As shown more clearly and by way of example in FIG. 2A, the devices $A_0$ and $A_1$ may comprise a seven-stage shift register, composed in a known manner of flip-flop devices or circuits, from the last and penultimate stages of which, according to the example shown, are derived a pair of pulse sequences delayed by a corresponding number of pulse steps or periods and applied to the inputs of a known modulus-two adder or exclusive OR-circuit functioning as a or polarity binary state reversing device or modulator. As is well known, such a device produces a positive output with either two positive or two negative input pulses applied thereto and produces a negative output with either of the input pulses being positive and the other input pulse being negative. The same applies to on-off type pulse sequences with the negative pulses being replaced by zero or no pulse.

The outputs of the logic circuits or modulus-two adders $P_0$ and $P_1$ of the devices $A_0$ and $A_1$ are returned to a preceding stage, preferably the input stage of the registers in the manner shown, to result in the production of a pair of random pulse sequences $e_0$ and $e_{10}$ having a recurrence period of $2^s-1$, wherein $s$ represents the number of register stages. The operation of a random sequence pulse generator of this type is well known and described for instance in greater detail in Electrical Technology, October 1960 issue, pages 389–394.

According to one mode of operation of the invention, to start and synchronize a sequence produced by the generator $A_1$ with the pulses produced by the generator $A_0$, the drawing. The synchronizing or starting period of the generator $A_1$ via a transmitting circuit or channel indicated by the dashed line CH and by way of a synchronizing switch $S_1$ connected as indicated in dotted line in the drawing. This synchronizing or starting period of the generator $A_1$ by the generator $A_0$ requires at least as many pulse steps or periods as there are stages of the shift registers forming part of the generators. Assuming no error or disturbing pulses to be contained in the transmitted or synchronizing pulse sequence $e_0$, the generator $A_1$, preferably after having been cleared or set to zero of all its stages, will be automatically started, to produce a pulse sequence $e_{10}$ in synchronism with the sequence $e_0$. Subsequently, the switch $S_1$ may be returned to the position shown in solid line, whereby both generators will continue to operate in synchronism, or to produce identical random pulse sequences $e_0$ and $e_{10}$ in step with one another.

It may occur, however, during the synchronizing period described hereinbefore, that one or more of the pulses $e_0$, on account of transmission errors or for other causes, arrive at the receiver with the wrong or reversed sign or polarity, that is, that the received pulse sequence $e_1$ differs from the transmitted sequence $e_0$ as to the sign of one or more pulses. If such a situation obtains during the starting or synchronizing period, synchronization may no longer be possible on account of the continuous recycling of the disturbed or error pulses through the feedback loop of the generator $A_1$ to be synchronized.

In order to eliminate the foregoing drawback or defect, or to restore synchronism between the generators $A_1$ and $A_0$, there is provided according to the present invention a polarity or sign modulator in the form of a modulus-two adder $P_{10}$ to the inputs of which are applied the pulse sequences $e_0$ and $e_{10}$ to be synchronized. In the case of exact synchronism between the latter which may consist for instance of random sequences of both positive and negative pulses (see FIG. 2B to be described later), the device $P_{10}$ produces an error-indicating output pulse sequence $e_2$ consisting of positive pulses only. On the other hand, assuming the simultaneously applied pulses $e_1$ and $e_{10}$ to be of different sign, as a result of a transmission disturbance or error in the sequence $e_0$, the device $P_{10}$ will produce an error indication signal in the form of a negative pulse $e_2$ by virtue of the function of the modulus-two adder or the like device $P_{10}$.

The present invention provides for the automatic correction of the resultant disturbed pulses $e_{11}$ in the case an error indicating signal $e_2$ deriving from the disturbance of the synchronism between the pulses $e_0$ and $e_{10}$, while, with an error pulse $e_1$ having no effect on the synchronism between the devices $A_0$ and $A_1$, the error correcting system will remain idle or inoperative. There is provided for this purpose a special error pulse monitoring device or circuit U comprising a shift register $B_1$ which is identical to the shift registers of the generators $A_0$ and $A_1$ and fed by the pulses $e_2$ of the modulus-two adder or error sensing device $P_{10}$. The output of the register $B_1$ is in turn applied to one of the inputs of an AND-gate or circuit $T_1$, the remaining input of which is controlled by the undelayed pulses or sequence $e_2$. The resultant output pulses $e_u$ of the AND-gate are utilized to control a suitable polarity or binary state reversing device K connected in the feedback or return circuit of the register of the generator $A_1$ and serving to convert an error pulse $e_{11}$ circulating through the register into the correct pulse $e_{10}$, in the manner described in greater detail in and understood from the following description in reference to the function and operation of the invention.

Assuming a negative error pulse $e_2$, deriving from a disturbed pulse $e_1$, to be accompanied by a disturbance of the synchronism between $A_1$ and $A_0$, the corresponding sequence $e_{10}$ will initially differ from the sequence $e_0$. As a consequence, $e_{10}$ represents a disturbance reaching the output stage of $A_1$ after a definite number of pulse steps or periods (determined by the number of register stages) and being returned as a disturbed return pulse $e_{11}$ through the device K, having a normal current passing direction, to the input of the modulus-two adder $P_{10}$, to thereby result in a further negative pulse $e_2$ at the output of $P_{10}$. After the same number of pulse periods, as determined by the registers of $A_1$ and $B_2$, the initial error pulse $e_2$ reaches the output stage of the register $B_1$ of the monitoring device, thereby applying two negative pulses $e_2$ and $e_{21}$ to the inputs of the gate $T_1$.

As a consequence, the simultaneous application of two negative input pulses to the gate $T_1$ constitutes a criterion as to the probability of one or more error pulses $e_{11}$ cyclically passing through the generator or register $A_1$ and causing the AND-gate $T_1$ to deliver a correcting pulse $e_u$ adapted to reverse the polarity of the returned pulse or pulses $e_{11}$ in the device K, to convert the same to the correct pulse $e_{10}$ and to restore the synchronism between the generators $A_1$ and $A_0$.

On the other hand, if an error indicating pulse $e_2$ derives solely from a disturbed incoming pulse $e_1$, as a result of a transmission disturbance, that is, if the error pulse has no effect on the synchronism between the devices $A_1$ and $A_0$, there will be no correction of $e_{10}$, since in this case a negative error pulse $e_2$ will ordinarily not be followed by a further negative pulse $e_2$ delayed in accordance with the delay time of the registers of $A_1$ and $B_1$. As a consequence, the gate $T_1$ remains ineffective, or no correcting pulse $e_u$ will be applied to the device K. In other words, the monitoring device U being controlled by the output pulses $e_0$ and $e_{10}$ of the generators $A_0$ and $A_1$, functions as a discriminating means between error pulses $e_1$ which, respectively, have and do not have an effect upon the synchronism between the devices $A_0$ and $A_1$.

Referring more particularly to FIG. 2A the random sequence pulse generators $A_0$ and $A_1$ and monitoring device U of FIG. 1 are shown in somewhat greater detail, each comprising, by way of example, a seven-stage pulse shift register $SR_0$, $SR_1$ and $SR_2$ operated in a known manner by a series of shift or clock pulses $p$ and having their last and penultimate stages feeding a modulus-two adder $P_0$, $P_1$ and $P_2$, respectively. The outputs of the latter are returned to the input stages of the registers, whereby to produce a pair of random pulse sequences $e_0$ and $e_{10}$ by the generators $A_0$ and $A_1$ to be synchronized, while the output of the device $B_2$ is applied, in a manner similar to FIG. 1, to one of the inputs of the AND-gate or circuit $T_1$.

Figure 2B:
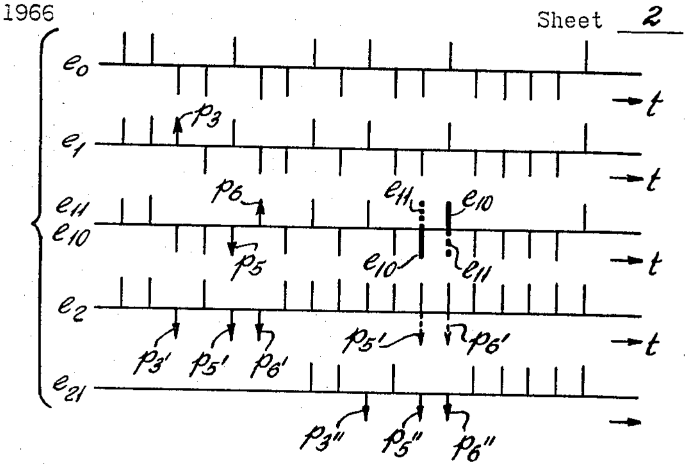
FIG. 2B is a theoretical diagram showing, by way of example, a number of correlated pulse sequences explanatory of the function and operation of the invention.

The function and operation of the invention will be further understood from the following specific example in reference to FIG. 2B. In the latter, there is shown a random pulse sequence $e_0$ produced by the device $A_0$ and consisting of positive and negative pulses represented on a time scale $t$. Normally, that is, in the case of synchronism between $A_1$ and $A_0$, the same sequence $e_{10}$ is produced by $A_1$ in step with the sequence $e_0$ produced by $A_0$. Assuming now the sequence $e_1$ to be disturbed, say by the third pulse ($p_3$) being reversed in polarity as indicated by the arrow in the drawing, due to a transmission disturbance or for any other reason, and assuming further this error pulse ($p_3$) to result in fifth and sixth error pulses of reversed polarity ($p_5$ and $p_6$) of the feedback or returned pulses $e_{11}$ in the device $A_1$, to practically prevent synchronous operation with the device $A_0$, the resultant error-indicating pulses ($p_3'$, $p_5'$, $p_6'$) of the pulse signal $e_2$ will result in the production of corresponding delayed indicating pulses ($p_3''$, $p_5''$, $p_6''$) of the signal $e_{21}$ by the register $SR_2$, said delayed pulses cooperating with the pulses $p_5'$ and $p_6'$, after a further roundtrip through $SR_1$, in the AND-gate $T_1$ in such a manner as to convert the error $e_{11}$ (shown in dotted line) to their proper polarity $e_{10}$ (shown in solid line) by the device K and to thereby result in the restoration of the synchronism between the pulse sequences $e_0$ and $e_{10}$, in a manner apparent from and further understood by reference to the diagram.

While in FIG. 2B the binary states of the pulses are shown as varying between positive and negative values, it will be understood that the same results apply to pulses varying in a known manner between 1 and 0, that is, with the negative states in the diagram characterized by the absence of a pulse, in accordance with well-known binary notation of signal and other values.

FIG. 2B also shows that an error pulse $p_3$ in the sequence $e_1$ which does not result in a disturbance of $e_{10}$ reversal or (absence of $p_5$ and $p_6$), or disturbance of the synchronism between the devices $A_1$ and $A_0$, will have no effect on the AND-gate $T_1$ and, in turn, on the polarity reverser K. In other words, the device U discriminates between transmission error pulses $e_1$ with or without effect, respectively, on the synchronism between the generators $A_1$ and $A_0$, in the manner pointed out hereinabove.

While the devices $A_0$ and $A_1$ of FIG. 2A may be synchronized in the manner shown by FIG. 1, that is, by first starting $A_0$ and applying the sequence $e_0$ to $A_1$ by way of the channel CH and starting or synchronizing switch $S_1$, an alternative operation may be by separately starting $A_0$ and $A_1$ and subsequently applying the pulse sequences $e_0$ and $e_{10}$ to the device $P_{10}$, to initiate and effect a synchronization in substantially the same manner as described. In such a case, the pulse sequences produced depend upon the initial states of the registers which may differ from one another at the instant of starting, whereupon the pulse sequence $e_{10}$ will be corrected consecutively during successive roundtrips or feedback cycles in the device $A_1$ until reaching a condition of equality of the sequences $e_0$ and $e_{10}$ assuming in-step operation or synchronism with one another.

In the case of a device according to FIGS. 1 and 2B, the possibility may arise of a plurality of disturbed error pulses $e_1$ following each other at predetermined intervals such as to simulate a definite circulatory disturbance in the shift register of the pulse generator $A_1$ at the receiving end. Such a simulated disturbance may in turn result in an actual disturbance of the synchronism of $A_1$ by virtue of the function of the monitoring circuit U and correcting device K. In order to avoid such a condition or operation, a multi-stage monitoring circuit may be used in accordance with an improved feature of the invention, as shown in FIG. 3.

Referring to the latter, there is shown, by way of example, a cascaded three-stage monitoring chain U with each of the stages thereof consisting of a shift register $B_1$, $B_2$, $B_3$ and associated AND-gate $T_1$, $T_2$, $T_3$, respectively, substantially corresponding to the registers of $A_1$ and $A_0$. More particularly, the output of each register is applied to one of the inputs of the associated AND-gate whose output is in turn applied to the input of the next register, while the remaining inputs of all the AND-gates are directly controlled by the error-indicating pulses $e_2$ and the output of the last AND-gate $T_3$ serves to control the polarity reversing device K, in substantially the same manner as in the case of FIGS. 1 and 2A.

Figures 3, 5A, 5B:
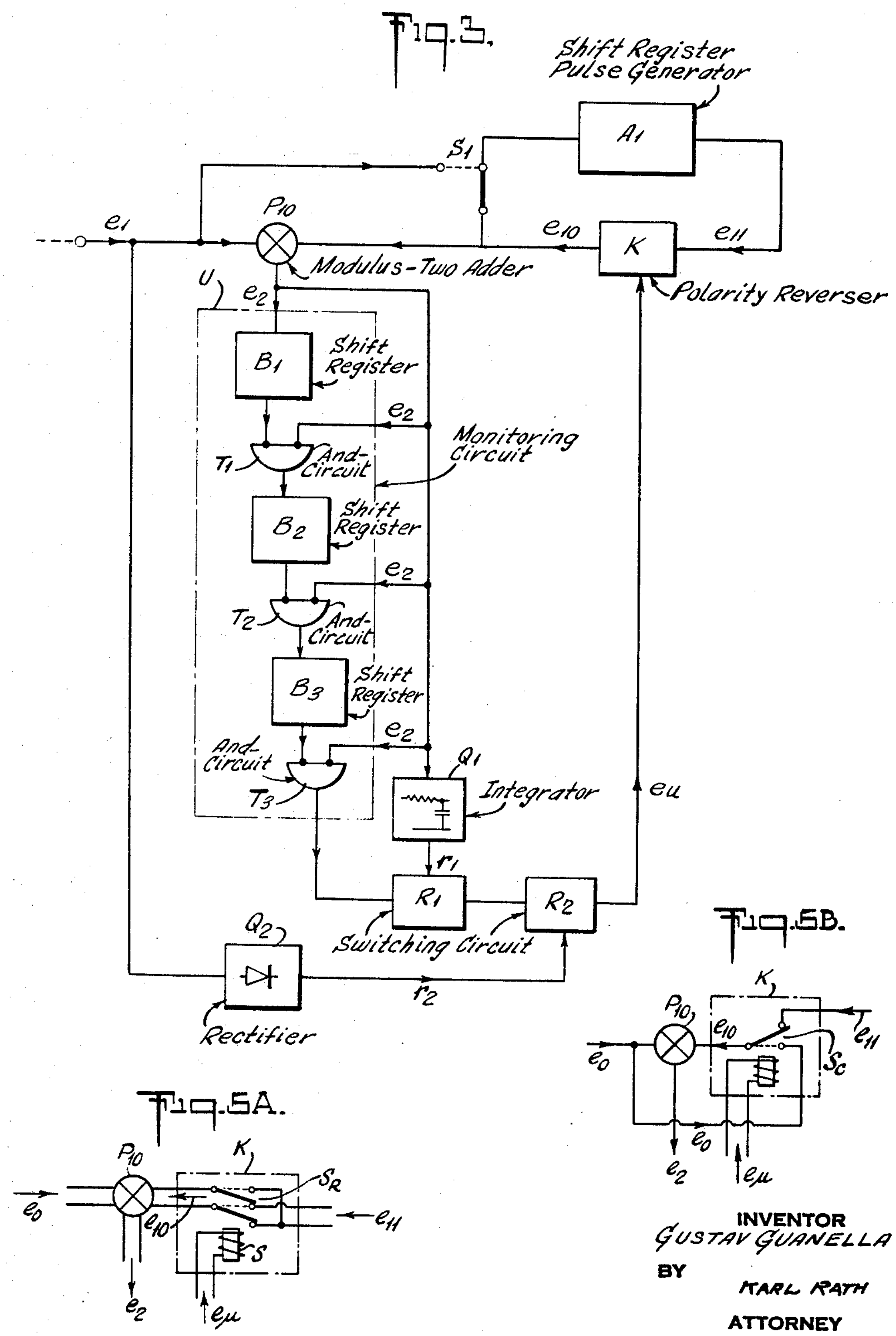
FIG. 3 illustrates in block diagram form an improved random sequence pulse synchronizing system according to the invention.
FIGS. 5A and 5B are fragmentary diagrams, more clearly illustrating polarity reversing or synchronism restoring devices according to the invention.

Referring to the operation of the system according to FIG. 3, a true error pulse or signal $e_{11}$ circulating in the device $A_1$ causes a number of successive error-indicating pulses $e_2$ in the output of the modulus-two adder $P_{10}$, in the manner described, each of said pulses functioning to simultaneously control one of the inputs of all the AND-gates $T_1$, $T_2$, $T_3$ to be actuated successively or at a plurality of sequential instants. More particularly, a definite error-indicating pulse $e_2$ reaches the output of the registers $B_1$, $B_2$, $B_3$ at instants at which the modulus-two adder $P_{10}$ delivers one of the subsequent error-indicating pulses to the input of the monitoring circuit, thereby to open the respective AND-gates, with the result that this error-indicating pulse is passed through all the stages of the circuit U in succession and a corresponding error correcting signal or pulse $e_u$ is finally delivered by the gate $T_3$ to the device K, to reverse the polarity of the respective disturbed feedback or return pulses $e_{11}$ in the device $A_1$, to thereby restore its synchronism with the received pulse sequence $e_0$.

In other words, while in the FIG. 1 or FIG. 2A arrangement a single roundtrip of an error pulse $e_{11}$ through the device $A_1$ suffices to result in its correction to the proper pulse $e_{10}$, three full roundtrips are required in the case of the FIG. 3 modification to produce a final error-correcting pulse $e_u$, to actuate the device K.

From the foregoing it will be evident that, if the error-indicating pulses $e_2$ should not appear in the proper temporal sequence (as determined by the design of the register of $A_1$), they cannot be transmitted through all the register stages $B_1$, $B_2$, $B_3$ of the monitoring circuit U, whereby no output pulse $e_u$ and in turn correction of the K may occur. Such a condition most probably obtains if the negative pulses derive solely from successive error pulses $e_1$ received over the transmitting channel CH rather than from any disturbed circulatory pulses $e_{11}$ of the device $A_1$.

Although three stages of the monitoring chain U have been found sufficient to avoid any simulated disturbance of the synchronism between the pulse sequences $e_1$ and $e_{10}$ as described in the foregoing, any other number of register stages may be used to suit existing conditions or operating requirements.

Correction by the polarity reversing device K is not desirable in the event of the occurence of a greater number of negative error-indicating pulses $e_2$ during a definite time period. A circuit $Q_1$ for integrating the error-indicating pulse train $e_2$ may be provided for this purpose designed to deliver a control voltage $r_1$ adapted to control a switch $R_1$, in such a manner as to interrupt the lead to the device K whenever the voltage $r_1$ exceeds a predetermined threshold value.

Correction by the device K should also not take place in the event that the pulse transmission $e_0$ or $e_1$ is interrupted. For this purpose, the received pulses are rectified in $Q_2$, to produce a further control voltage $r_2$ adapted to operate a switch $R_2$ opening the control circuit of the device K whenever the voltage $r_2$ drops below a predetermined threshold value.

A device utilizing a multi-stage monitoring circuit as shown in FIG. 3 may be both relatively bulky and expensive. According to an improved modification as shown in FIG. 4, only a single stage monitoring circuit is used to produce the same result and effect as the circuit according to FIG. 3.

Figure 4:
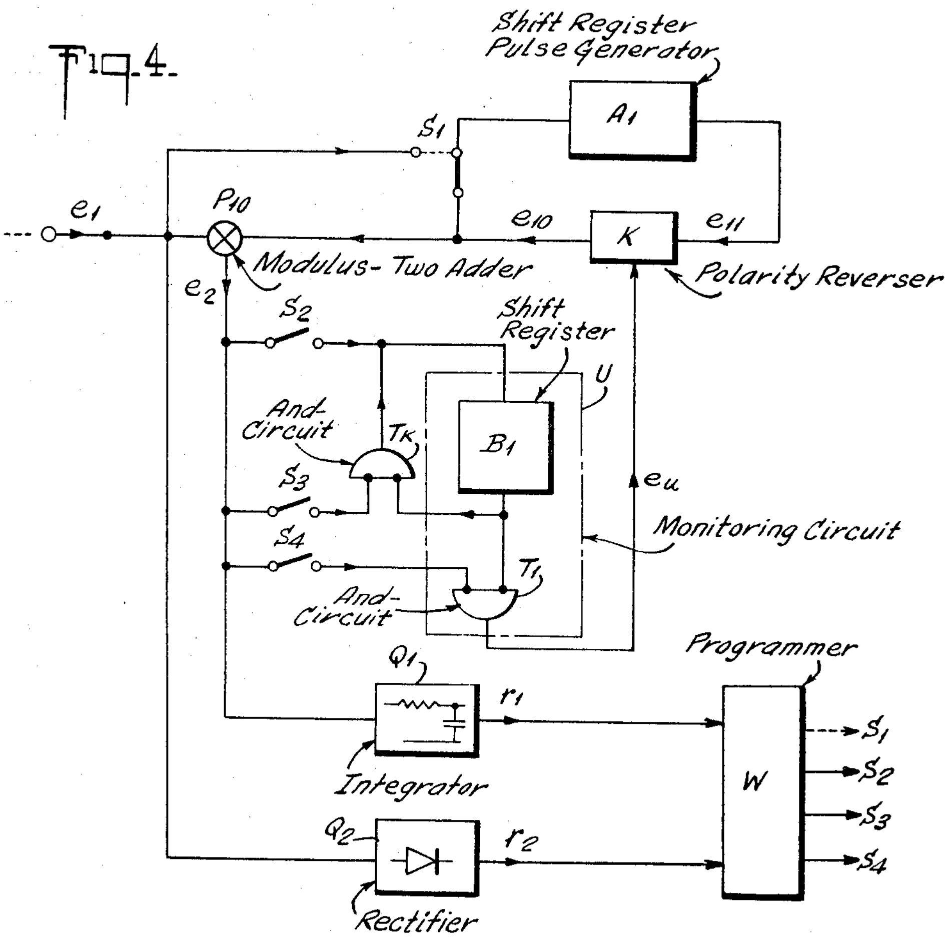
FIG. 4 shows a modification of the system according to FIG. 3.

Referring to the FIG. 4 modification, a negative error-indicating pulse $e_2$ is returned one or more times to the input of the monitoring circuit by an auxiliary AND-gate and suitable programme-control means. After synchronization has been initiated by feeding the pulse train or sequence $e_0$ generated at the transmitted end into the receiving register $A_1$ via the switch $S_1$, the switches $S_2$–$S_4$ are selectively closed by the programmer W during three further switching periods or cycles. If now a negative error-indicating pulse $e_2$ appears, it is first of all fed via the switch $S_2$ into the monitoring chain U.

During the following switching period, this negative pulse circulates one or more times through the device $B_1$ via the auxiliary AND-gate $T_k$, provided that in each case further negative error indicating pulses are fed via the switch $S_3$ to the second input of said gate in order to clear the way for the circulating negative pulse at the right instant.

During a last switching period, the switch $S_4$ is then closed in order finally to deliver the circulating pulse as a control pulse $e_u$ for the polarity reversing device K, and via the AND-gate T as in the case of the modification of the invention according to FIG. 1.

The programmer W controls the switches S—S. However, operation of the programmer may be interrupted in the event that synchronization prevails over a fairly long time period without any errors occurring, or if there should be a break in the signal transmission. These aims may be achieved by means of the control voltages $r_1$ and $r_2$ produced by the circuits or devices Q and Q in the same manner as in the modification shown by FIG. 3.

Referring to FIG. 5A, there is shown, by way of example, a polarity reversing switch $S_R$ as a synchronism restoring device K controlled through a solenoid S by the correcting pulses $e_u$, to convert an error pulse $e_{11}$ into the correct pulse $e_{10}$, in the manner described hereinbefore. In place of the mechanical switch shown for illustration, an equivalent electronic such as a transistor switch or normally short-circuited polarity reversing gate may be used for the purpose of the invention.

FIG. 5B illustrates an alternative way of changing an error pulse $e_{11}$ into the correct pulse $e_{10}$ by replacing it by a pulse derived from the received sequence $e_0$ by the aid of a change-over switch $S_C$ controlled by the pulses $e_u$.

In the foregoing the invention has been described in reference to a few specific illustrative devices or circuits. It will be evident, however, that variations and modifications, as well as the substitution of equivalent parts and circuits for those shown herein for illustration, may be made without departing from the broader scope and spirit of the invention as set forth in the appended claims. The specification and drawings are accordingly to be regarded in an illustrative rather than in a restrictive sense.

I claim:

1. The combination with a system of the character described including identical first and second pulse generators comprised, respectively, of first and second pulse shift registers each having an input and an output derived from at least two register stages through first and second logic circuits and first and second feedback circuits connecting the outputs of said logic circuits with a preceding stage of the respective registers, to produce identical first and second random sequence pulse trains by said generators, of means to synchronize the pulse train produced by said second generator by the pulse train produced by said first generator comprising in combination:

(1) a modulus-two adder having a pair of inputs and an output circuit, (2) means to apply pulses of each of said trains to one of said inputs, to produce an error-indicating pulse in said output circuit upon the occurrence of different binary states of two simultaneous pulses of said trains, (3) a monitoring circuit comprising (a) a third shift register and third logic output circuit therefor identical to the registers and associated logic circuits of said generators (b) an AND-circuit having a pair of inputs and an output, and (c) means to connect the input of said third register to one input of said AND-circuit and to connect the output of said third logic circuit to the other input of said AND-circuit, (4) means to connect the output of said modulus-two adder to the input of said third register, whereby to produce a normal output pulse of one polarity by said AND-circuit during synchronism between said pulse trains and to produce an error-correcting pulse of opposite polarity in the output of said AND-circuit in the event of error pulse repeatedly passing through said second register, and (5) correcting means included in said second generator and connected to the output of said AND-circuit, to reverse the binary state of an error pulse in said second generator upon the occurrance of at least two sequential error-indicating pulses caused thereby in said output circuit.

2. In a synchronizing system as claimed in claim 1. said first, second and third logic circuits each consisting of a modulus-two adder.

3. In a synchronizing system as claimed in claim 1, including means to integrate pulses derived from the error-indicating pulses delivered by the output of said modulus-two adder, to produce a control voltage, and switch means inserted in the output circuit of said AND-circuit and effective in opening the same and disabling said correcting means upon said control voltage exceeding a predetermined threshold value.

4. In a synchronizing system as claimed in claim 1, including means to rectify pulses derived from the pulse train of said first generator, to produce a control voltage, and switch means inserted in the output circuit of said AND-circuit and effective in opening the same and disabling said correcting means upon said control voltage decreasing below a predetermined threshold value.

5. In a synchronizing system as claimed in claim 1, said correcting means consisting of a polarity reverser responsive to an error-correcting output pulse of said AND-circuit.

6. In a synchronizing system as claimed in claim 1, said correcting means consisting of a change-over switch to replace an error pulse in said second generator by the corresponding pulse of said first generator in response to the occurrence of an error-correcting output pulse of said AND-circuit.

7. In a synchronizing system as claimed in claim 1, including means in said monitoring circuit to cause said AND-circuit to produce an error-correcting output pulse after a plurality of recycling periods of an error pulse through said second generator.

8. In a synchronizing system as claimed in claim 7, said last means consisting in said monitoring circuit being comprised of a plurality of cascade-connected shift registers having logic circuits and associated AND-circuits, the input of the first register and one of the outputs of each AND-circuit being connected to said output circuit, the remaining inputs of the AND-circuits being connected to the outputs of the preceding registers, and the output of the last AND-circuit being connected to said correcting means.

9. In a synchronizing system as claimed in claim 7, said last means being comprised of an auxiliary AND-circuit having an input connected to the output of said third register and having an output connected to the input of said third register, and programmed switching means to sequentially control the input of said third register, the remaining input of said auxiliary AND-circuit and the output of said third AND-circuit, to repeatedly pass an error-indicating pulse through said third register prior to its actuating said third AND-circuit, to produce a correcting pulse.

10. In a synchronizing system as claimed in claim 1, including a synchronizing switch to temporarily apply the pulse train of said first generator to said second generator, to start said second generator by and to synchronize it with said first generator.

11. The combination with a pair of pulse generators of the type producing first and second random sequence pulse trains and wherein an error pulse of disturbed polarity of the second generator caused by a disturbance of the synchronism between said generators occurs in predetermined cyclic sequence in the output of said second generator, of synchronizing means comprising in combination:

(1) a modulus-two adder having a pair of inputs and an output circuit, (2) means to apply pulses of each of said trains to one of said inputs, to produce an error-indicating pulse in said output circuit upon the occurrence of different binary states of two simultaneous pulses of said trains (3) a monitoring circuit comprising (a) pulse delay means having an input connected to said output circuit, to delay an error-indicating pulse applied thereto by a period equal to at least one of the recycling periods of the corresponding error pulses in said second generator, (b) an AND-circuit having a pair of inputs and and output, and (c) means to connect the input of said delay means to one input of said AND-circuit and to connect the output of said delay means to the other input of said AND-circuit, and (4) correcting means included in said second generator and connected to the output of said AND-circuit, to reverse the binary state of an error pulse in said second generator upon the occurrence of at least two sequential error-indicating pulses in said output circuit.

References Cited

UNITED STATES PATENTS

| | | | |
|---|---|---|---|
| 3,028,552 | 4/1962 | Hahs | 328—63 X |
| 3,171,082 | 2/1965 | Dillard et al. | 328—60 |
| 3,363,183 | 1/1968 | Bowling et al. | 328—63 |

JOHN S. HEYMAN, *Primary Examiner.*

U.S. Cl. X.R.

328—37, 153; 331—78